April 30, 1968 K. E. DILLENDER 3,380,776
CHILD HARNESS ADAPTER MEANS FOR SAFETY BELTS
Filed June 23, 1966 3 Sheets-Sheet 1

INVENTOR
Karl E. Dillender
BY Rommel, Allmine & Rommel
ATTORNEYS

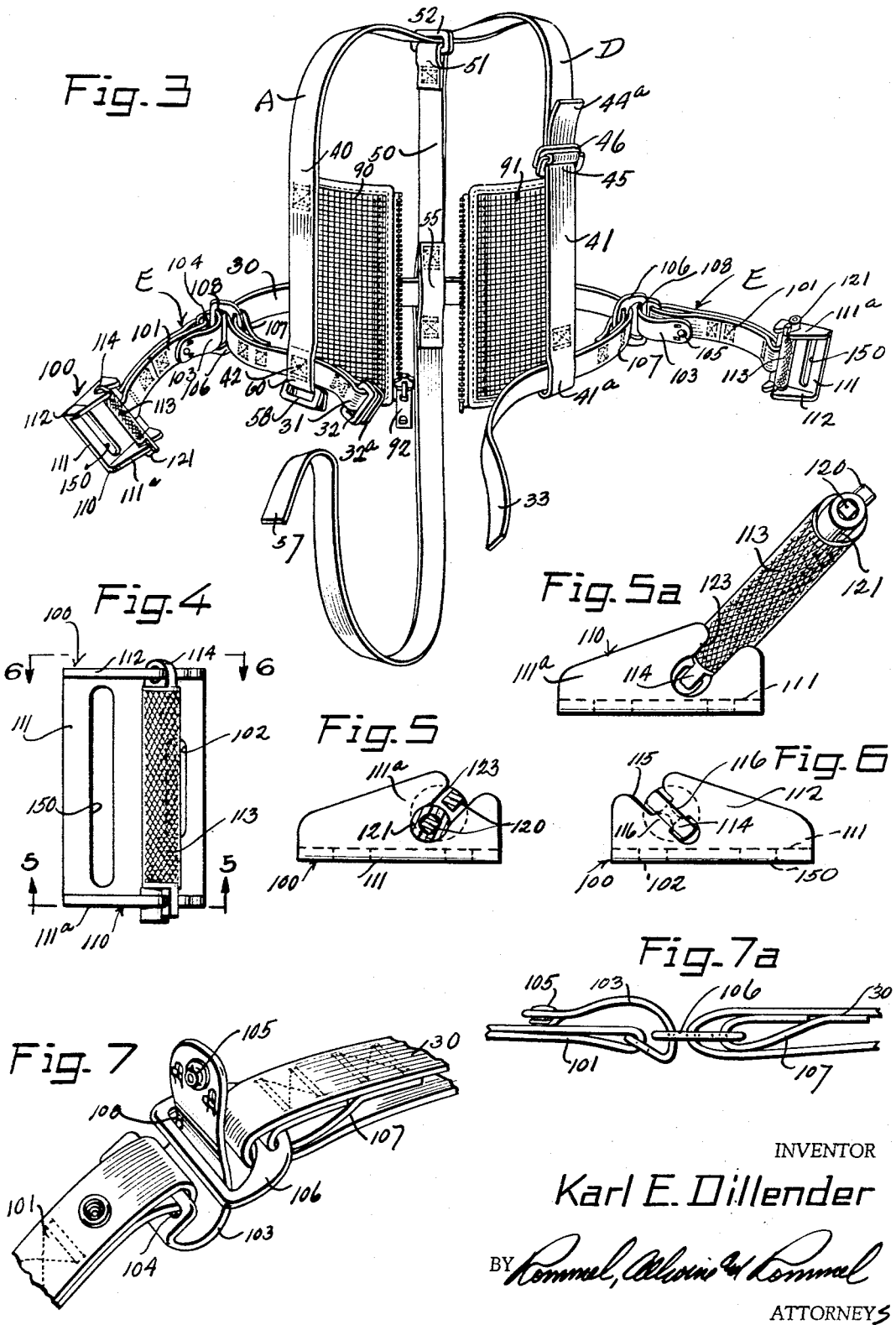

April 30, 1968 K. E. DILLENDER 3,380,776
CHILD HARNESS ADAPTER MEANS FOR SAFETY BELTS
Filed June 23, 1966 3 Sheets-Sheet 3
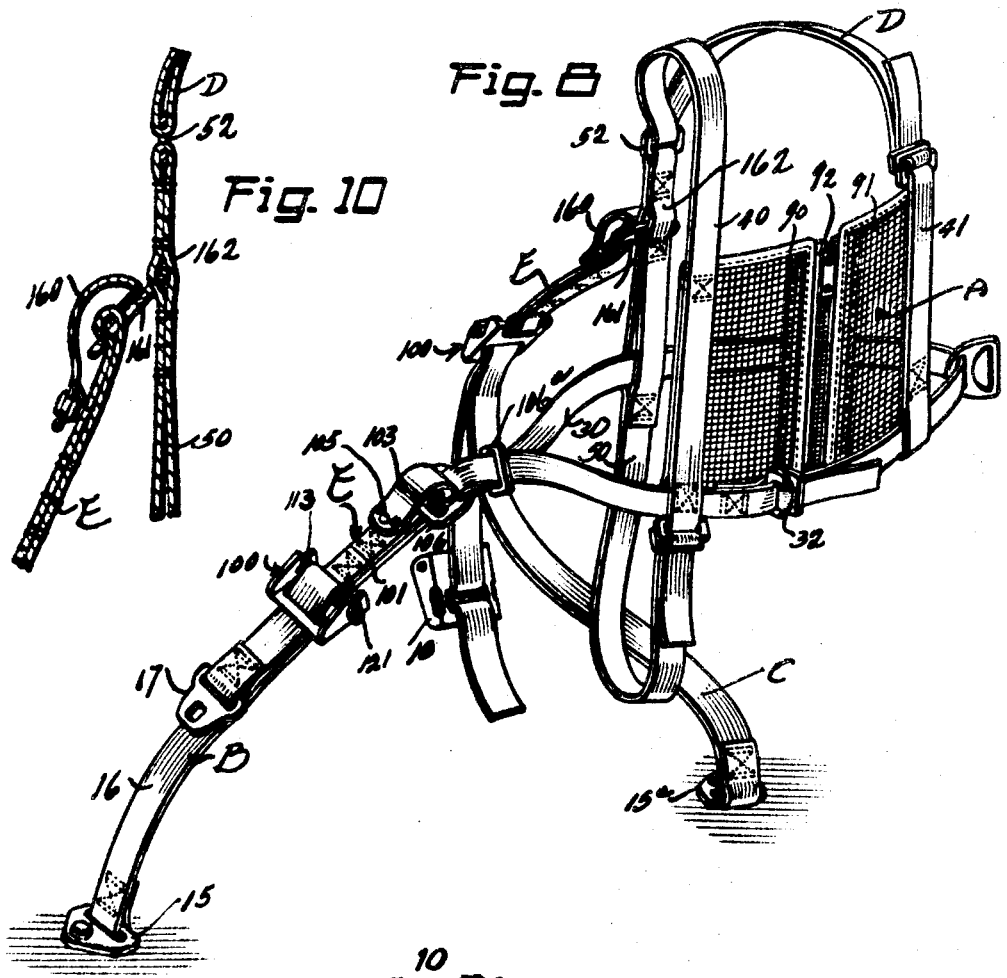
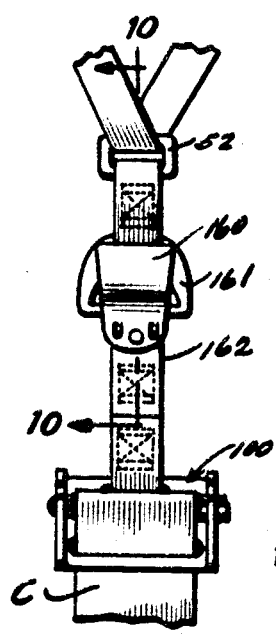
INVENTOR
Karl E. Dillender
BY *Rommel, Allwein & Rommel*
ATTORNEYS United States Patent Office 3,380,776
Patented Apr. 30, 1968

3,380,776
CHILD HARNESS ADAPTER MEANS
FOR SAFETY BELTS
Karl E. Dillender, Lexington, Ky., assignor to Irving
Air Chute Company, Inc., Lexington, Ky., a corporation of New York
Filed June 23, 1966, Ser. No. 559,991
9 Claims. (Cl. 297—389)

This invention relates to improvements in child's safety harnesses and has more particular reference to an adapter means by which the harness may be easily attached to conventional, already installed, automobile safety belts.

A further object of this invention is the provision of a child's harness generally partaking of the structure of the child's safety harness shown in U.S. Patent No. 3,321,247, dated May 23, 1967. The present invention differentiates over the harness securing means of the above identified application in that adjustable adapter means is provided for direct connection of the child's harness of Patent 3,321,247 to the conventional webbing ends of car safety belts, and thus eliminating the necessity of providing additional straps or webbing as car anchor points.

A further object of this invention is the provision of an improved child's safety harness for automobiles in which an adjustable adapter or locking means is provided for adjustably and detachably connecting some portion of the child's harness of Patent 3,321,247 to the conventional safety belt webbing ends.

A further object of this invention is the provision of a child's safety harness provided with side adapters which have means for detachable connection with the flexible lap strap webbing of conventional safety belts.

Other objects and advantages of this invention will be apparent during the course of the following detailed description, taken in connection with the accompanying drawings, forming a part of this specification, and in which drawings:

FIG. 3 is a perspective view showing the opened child's harness and improved safety belt adapter means.

FIG. 4 is a plan view of a safety lock for securing the child's safety harness to a seat belt.

FIG. 5 is a cross sectional view taken through the lock substantially on the line 5—5 of FIG. 4.

FIG. 5a is a side elevation of one end of the adapter shown in FIG. 4 with its locking bar lifted out of a retaining slot in the base of the adapter, as would be the case when attaching the adapter to a safety belt.

FIG. 6 is an end view of the adapter taken from the direction shown by the line 6—6 in FIG. 4.

FIG. 7 is a perspective view of an attaching clip of the adapter means, in open position, showing its connection to the belt of a child's harness.

FIG. 7a is a view showing the clip of FIG. 7 in closed position.

FIG. 8 is a perspective view of a modified form of connecting a safety belt to the child's harness.

FIG. 9 is a fragmentary rear view showing the modified harness connection of FIG. 8.

FIG. 10 is a cross sectional view taken substantially on the line 10—10 of FIG. 9.

FIG. 11 is a fragmentary view of an easily opened adapter latching means for securing the car safety belt to a child's harness.

Figure 1:
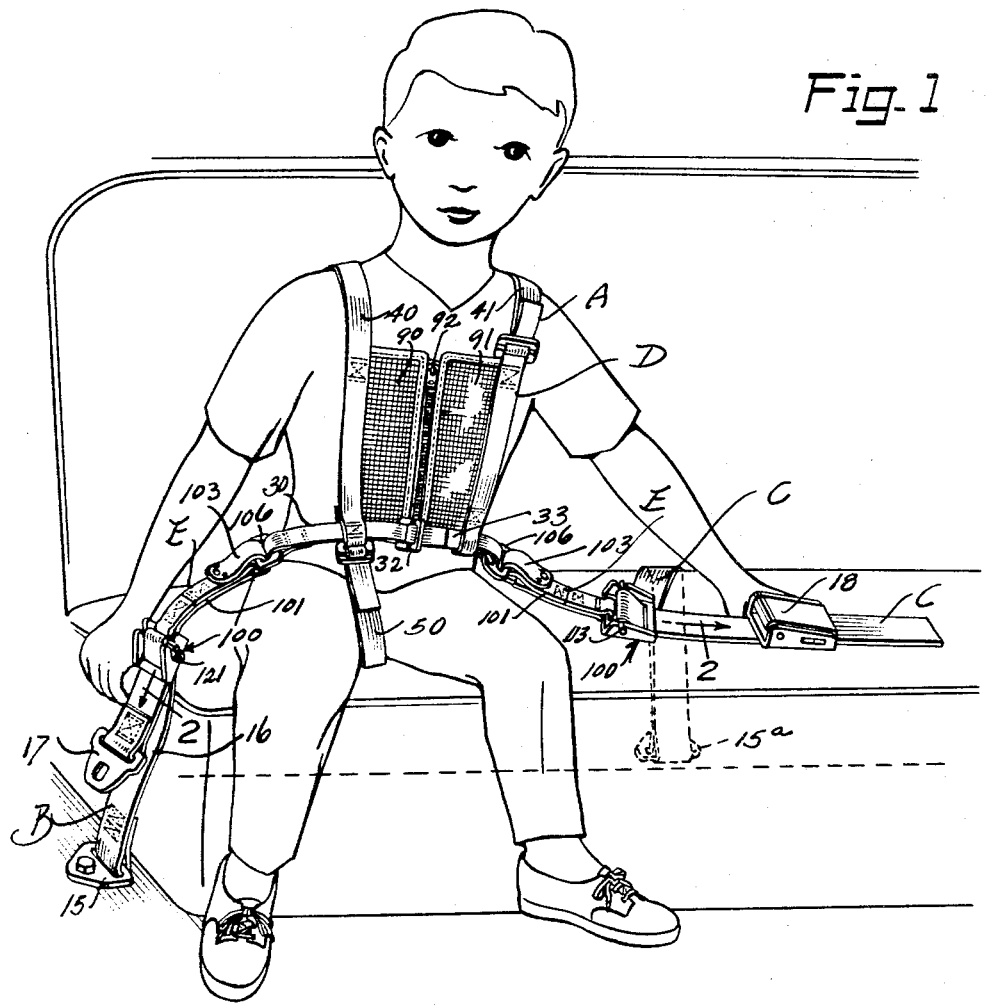
FIG. 1 is a perspective view showing a child's harness secured by an improved adapter means to the conventional safety belts of an automobile vehicle.

In the drawings, wherein for the purpose of illustration are shown preferred and modified forms of the invention, the letter A may generally designate a child's safety harness of the construction set forth in U.S. Patent No. 3,321,247 dated May 23, 1967. It is a primary purpose of the present invention to provide adapter means for connection of the child's harness to conventional safety belts B and C for the purpose of more securely attaching the child's safety harness to the child and under such circumstances that the child's harness can be fitted to conventional safety belts B and C without the necessity of modifying the structure of the conventional safety belts, except for a folding operation.

Safety belts B and C are for grown children or adults and their attachment to the vehicle is purely conventional. One instance may include the belt B attached at 15 to the vehicle frame; the same having a flexible webbing 16 which at the opposite end is provided with a buckle locking tongue 17. The other strap C may be attached at 15$^a$ to the vehicle frame and usually extends up between the seat cushion and back cushion of the vehicle seat, as shown in FIG. 1; the same having an adjustable locking buckle 18 thereon. The clip 17 and buckle 18 may be of any conventional types such as shown in U.S. Patent 3,273,214 dated Sept. 20, 1966 or U.S. Patent 3,349,455 dated Oct. 31, 1967. It is thus well known that the conventional belts B and C are detachably connected together by the tongue 17 and buckles 18, the former slipping into the latching mechanism of the latter, from which it may be freed in any of the different ways known to the art.

The vest or body encasing portion D of the child's harness preferably comprises a waist band or strap portion 30 of flexible webbing, one end of which has a fixed loop 31 supporting rings 32 and 32$^a$ of a conventional slip coupling. The opposite end of the waist band 30 is adapted to be doubled upon itself and slipped through coupling ring 32$^a$ which at the bight end is slipped through the opening of the coupling member 32 in a manner well known to those skilled in the art; the free end 33 at the waist band being the adjusting end.

The child's harness furthermore includes front flexible upright straps or webbing 40 and 41, the former of which is stitched at 42 to the waist band 30 adjacent to but spaced from the coupling member 32. The lower end of strap 41 is looped at 41$^a$ and slidable along the waist strap 30. The front strap portions 40 and 41 extend upwardly. The portion 40 is continuously extended across the back at 44 and connected to the upper looped portion 45 of the strap 41 by means of a coupling 46 comprising a pair of the adjusting coupling rings such as shown at 32 and 32$^a$. The end 44$^a$ may be adjusted through the coupling rings 46 for the purpose of varying the length of the upper crossed portion of the shoulder straps at the back of the wearer.

A back and crotch strap or web 50 is provided at its upper rear portion with a loop 51 which holds an apertured connector ring 52 through the opening of which the cross strap portion 44 is slidably threaded between the shoulder straps. The strap 50 where it passes the strap 30 is provided with a loop 55 slidably enclosing the rear of the waist band for lateral adjustment thereon. On the crotch strap 50 is a free end 57 and it is adapted to be adjustably connected to a ring-type coupling 58 composed of two rings, such as the rings 32 and 32$^a$ above described, both of which are threaded through the lower looped end 60 of the front strap 40. The rings receive the end 57 for adjustment purposes in a manner well understood in the art. Thus, the strap 50 forms a back and also a leg or crotch loop for adjustment between the legs of the wearer. Pulling on the strap end 57 adjusts the strap 50 to the stature of the wearer.

Figure 2:
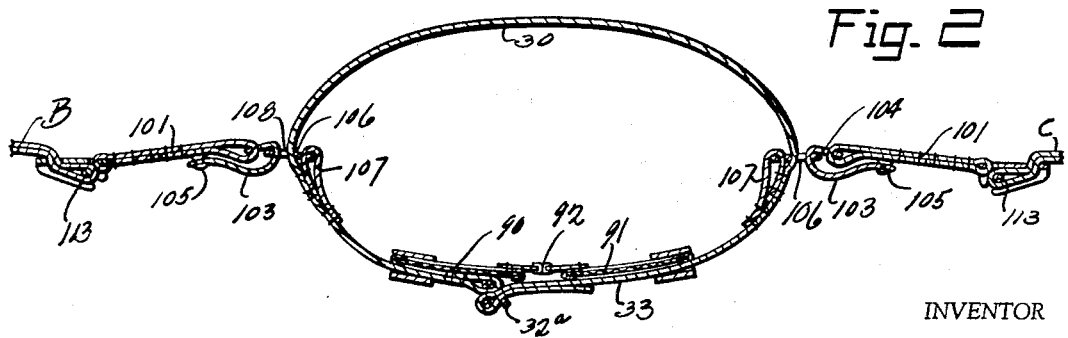
FIG. 2 is a cross sectional view taken through the belt portion of the child's harness showing two improved adapters connected to the conventional safety belts; the view being taken on the line 2—2 of FIG. 1.

The front straps 40 and 41 are quite widely spaced and secured to the rear thereof are panels 90 and 91 formed of marginally bound perforate nylon netting. These panels 90 and 91 lie between the straps 40 and 41 and they are secured together at their proximate margins by means of a slide fastener 92 which opens at the waist belt as shown in FIG. 2.

Two adapter means E are provided for adjustable securement of the child's harness A to the two conventional safety belts B and C or to the safety belt B and some portion of the child's harness to be subsequently described, as shown in a modified form in FIG. 8.

Each adapter means E includes an adjustable clamping assemblage 100 adapted for detachable connection anywhere on either of the straps B or C. To this adjustable clamping member 100 a strap extension 101 is connected through an opening 102 provided in the adjustable member 100; the strap 101 preferably being flexible and doubled upon itself and at its opposite end having mounted thereon an attaching clip 103. The clip 103 in longitudinal cross section is rather J-shaped as shown in the cross sectional views of FIGS. 2 and 7ᵃ. It is provided with a slot 104 shown in FIG. 7, through which the strap 101 is threaded. This enables the clip 103 to be swung upon the strap so that its lift-the-dot fastener 105 may be connected or disconnected while opening or closing the clip. Its opened position is shown in FIG. 7 and the closed position is shown in FIG. 7ᵃ and elsewhere in the drawings.

The waist band 30 at opposite sides is provided with adapter connecting rings 106 which are secured for limited adjustment therealong by fabric loops 107, as shown in FIG. 3. These rings 106 are provided with slots 108 therein adapted to receive the tongue portions of the clips 103.

Referring to the adapter member 100, the same includes a rigid frame structure 110 which includes a base 111 and upstanding side flanges 111ᵃ and 112. The base 111 has the opening 102, above described, to which the strap 101 is connected.

The adapter 100 includes a lock bar 113 which has an apertured end extension 114 pivoted to the flange 112 in a slot 115 on extension portions 116 which project into the slot 115. This slot 115 is located at an acute angle with respect to the plane of the base 111, as shown in FIG. 6. This connection is sufficiently loose to permit the knurled lock bar 113 to be easily swung to opened position upon the base 111 for securement to the belt straps B and C.

The lock bar 113 is knurled in order that it may clamp the safety belt webbing against the bottom wall 111 of the frame 110. The opening end of the bar 113 consists of a pair of polygonal cross sectional spaced extensions 120, as shown in FIG. 5 and the innermost thereof is provided with a flexible plastic tube 121 slipped thereon. The wall 111ᵃ of the frame structure 110 is provided with an obtuse angled slot 123 therein into which the opening end of the lock bar 113 may be extended to position the said lock bar in belt clamping position. It is shown in FIG. 5ᵃ that the slot 123 is narrow at its outer end and enlarged at its inner end. Since the clamp tube 121 is preferably of flexible plastic and quite tough, it can be compressed as it slips through the narrow portion of the slot 123 and then will come to securely held position in the lower wider portion of the slot 123, as shown in FIG. 5.

As is shown in the drawings, the conventional safety belts B and C are preferably doubled upon themselves prior to securement of the adapters 100 thereto. The base 111 has a slot 150 therein through which the doubled belts B and C are slipped. With the lock bar 113 in opened position the loop portions of the belt webbing extended through the slots 150 is then extended around the bars 113 and the bars moved back into latched position. This securely holds the straps 101 against travel in either direction along the seat belt to which attached.

It is shown in FIG. 1 that the two conventional seat belts B and C are utilized for child retaining purposes, except for the adapter means which detachably and adjustably connects the same to the child's harness. Any size child capable of fitting within the harness can be securely held in safety position upon the seat structure, as shown in FIG. 1.

While it is shown in the form of invention of FIG. 1 that the seat belts B and C are directly attached to the harness waist band 30, another mode of safety connection may be used as shown in FIGS. 8, 9 and 10 wherein the safety belt B is connected as above described, but the belt C has an attaching clip 160 similar to clip 106 which is detachably connected to an adapter ring or plate 161 secured loosely in a doubled portion 162 of the back strap 50. It will be obvious that the child is then secured at the rear upper back by the belt portion C at a location higher than the pelvic area, for safety purposes. To hold the ring 106 in place on the harness, as shown in FIG. 8, a securing ring 106ᵃ may be slidably applied to the doubled side of belt 30.

Various changes in the size, shape and arrangement of parts may be made to the forms of invention herein shown and described without departing from the sprit of the invention or scope of the claims.

I claim:

1. In a safety harness the combination of a vehicle having a frame structure and seat and a pair of relatively spaced conventional flexible safety belts secured to the car frame, buckle means for detachably connecting said belts together to hold an occupant in safety upon the seat, a body harness, and adapter means connected to the body harness for adjustable and releasable connection of the body harness to said safety belts in secured relation therewith when the safety belts are unbuckled.

2. The safety harness as described in claim 1 in which the body harness is a child's harness and comprises a waist band, and adapter means is provided for each safety belt comprising means for securement to the waist band and to the adacent conventional safety belt when the latter is in opened buckle released position with respect to the other safety belt.

3. A child's harness as described in claim 1 in which the adapter means comprises flexible extensions having means for detachable connection to said child's harness, said strap extensions at their outer ends having clamps for adjustable and locking connection with the conventional safety belts.

4. In combination with an automobile seat, including a seat portion and a back portion, safety belts of flexible material having means for connecting them to a car frame at their outer ends and buckle means at their inner ends for detachably connecting them together to hold an individual on the seat, a child's harness including a waist strap having connector rings at the sides thereof, and adapter structures for connecting each of said rings to the adjacent safety belts including a clip for said rings and an adjustable clamp for connection with each of said safety belts at a desired location therealong.

5. The harness described in claim 4 in which the adapter structures each comprise a clip at the inner end for releasable securement to the child's harness connector ring, a flexible belt extension connected to the clip, and a releasable clamping member at the outer end of each belt extension for connection to the safety belt.

6. In a clamping structure for the securement of flexible strap portions, such as belt webbing, together, the combination of a base having a webbing receiving slot therethrough and side portions extending transversely therefrom, a lock bar pivotally connected to one side portion of the base having means at the outer end for releasable locked connection to the other side bar to hold said bar in close strap locking position with respect to the base.

7. The clamping structure defined in claim 6, having a base with upstanding side flanges thereon, said base having a slot therein for receiving a doubled portion of a safety belt therethrough, said side portions having acute angled slots therein sloping towards the base and spaced from the slot, a locking bar pivoted in the slot of one of said upstanding portions and having means for releasable connection in the slot of the other upstanding portion whereby to position said bar in close belt clamping relation with said base.

8. In combination with an automobile having a frame, a pair of safety belt webs including flexible portions secured at their outer ends to the frame and at their free inner ends having buckle parts for detachable connection together to provide a lap strap for holding an individual upon an automobile seat, a child's harness including a flexible waist belt, adapter means connected to the flexible waist belt of the child's harness for adjustably and releasably securing one side of the child's harness to the flexible portion of one of the safety belts, and adapter means for adjustably and releasably securing the other side of the child's harness to the flexible portion of the flexible portion of the other seat belt.

9. The combination defined in claim 8 in which the child's harness is provided with shoulder and back straps connected to the waist belt.

References Cited

UNITED STATES PATENTS

| | | | |
|---|---|---|---|
| 1,316,163 | 9/1919 | Kennedy | 297—389 X |
| 1,326,716 | 12/1919 | Dukining | 297—389 X |
| 1,332,328 | 3/1920 | Fisher | 297—389 X |
| 1,369,456 | 2/1921 | Meredith | 297—389 X |
| 3,301,594 | 1/1967 | Pukish | 782—3 |
| 3,316,017 | 4/1967 | Knight | 297—385 |

JAMES T. McCALL, *Primary Examiner.*